(12) United States Patent
Chen

(10) Patent No.: US 12,219,637 B1
(45) Date of Patent: *Feb. 4, 2025

(54) METHOD FOR CHANNEL STATE FEEDBACK IN A NON-SIMULTANEOUS TRANSMIT AND RECEIVE (NSTR) OPERATION MODE

(71) Applicant: TP-LINK CORPORATION PTE. LTD., Singapore (SG)

(72) Inventor: Junbin Chen, Shenzhen (CN)

(73) Assignee: TP-LINK CORPORATION PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,610

(22) Filed: Jan. 11, 2024

Related U.S. Application Data

(63) Continuation of application No. 18/491,772, filed on Oct. 22, 2023.

(51) Int. Cl.
*H04W 76/15* (2018.01)
*H04W 76/27* (2018.01)

(52) U.S. Cl.
CPC ........... *H04W 76/15* (2018.02); *H04W 76/27* (2018.02)

(58) Field of Classification Search
CPC ..... H04W 52/14; H04W 72/21; H04W 72/51; H04W 72/0446; H04W 72/1273; H04W 56/001; H04W 76/15; H04W 52/248
USPC .......................... 455/450; 370/252, 336, 329
See application file for complete search history.

(56) References Cited

U.S. PATENT DOCUMENTS

| | | | |
|---|---|---|---|
| 9,210,675 B2 * | 12/2015 | Dinan | H04L 5/0098 |
| 9,344,299 B2 * | 5/2016 | Seo | H04L 5/0023 |
| 9,614,652 B2 * | 4/2017 | Wager | H04W 72/21 |
| 9,742,591 B2 * | 8/2017 | Seo | H04L 5/0023 |
| 9,749,996 B2 * | 8/2017 | Park | H04L 5/0048 |
| 9,942,916 B2 * | 4/2018 | Gao | H04L 5/0087 |

(Continued)

FOREIGN PATENT DOCUMENTS

WO 2023027800 A1 3/2023

OTHER PUBLICATIONS

N. Korolev, I. Levitsky, I. Startsev, B. Bellalta and E. Khorov, "Study of Multi-Link Channel Access Without Simultaneous Transmit and Receive in IEEE 802.11be Networks," in IEEE Access, vol. 10, pp. 126339-126351, 2022, doi: 10.1109/ACCESS.2022.3225978 (Year: 2022).*

*Primary Examiner* — William D Cumming
(74) *Attorney, Agent, or Firm* — Loeb & Loeb LLP

(57) ABSTRACT

This disclosure provides a method for channel state feedback in a non-simultaneous transmit and receive (NSTR) operation mode and the communication device thereof. The method implemented in a first communication device, the first communication device being configured with a plurality of links for communicating with a second communication device, the method including: receiving first data over a channel of a first link of the plurality of links; determining whether a channel of a second link of the plurality of links is idle in a case that no data is received over the channel of the second link and the first link and the second link belong to a non-simultaneous transmit and receive (NSTR) link pair; and transmitting a feedback frame over the channel of the first link, wherein the feedback frame includes a first field indicating whether the channel of the second link is idle.

20 Claims, 9 Drawing Sheets

(56) References Cited

U.S. PATENT DOCUMENTS

| | | | |
|---|---|---|---|
| 10,200,214 B2* | 2/2019 | Seo | H04L 25/0228 |
| 10,349,388 B2* | 7/2019 | Chun | H04W 4/70 |
| 10,536,932 B2* | 1/2020 | Chun | H04L 1/0075 |
| 10,863,490 B2* | 12/2020 | Chun | H04L 1/0026 |
| 11,096,157 B2* | 8/2021 | Chun | H04W 28/10 |
| 11,153,128 B2* | 10/2021 | Seo | H04L 5/0057 |
| 11,304,254 B2* | 4/2022 | Omer | H04W 76/15 |
| 11,432,326 B2* | 8/2022 | Lu | H04W 76/15 |
| 11,483,887 B2* | 10/2022 | Seok | H04W 76/30 |
| 11,516,841 B2* | 11/2022 | Lu | H04W 74/002 |
| 11,690,107 B2 | 6/2023 | Seok | |
| 11,838,957 B2* | 12/2023 | Xia | H04L 27/2662 |
| 11,877,321 B2* | 1/2024 | Lu | H04W 74/0816 |
| 11,889,435 B2* | 1/2024 | Seok | H04W 76/15 |
| 2013/0010740 A1* | 1/2013 | Kim | H04B 7/0647 370/329 |
| 2013/0188617 A1* | 7/2013 | Dinan | H04W 72/0446 370/336 |
| 2014/0016497 A1* | 1/2014 | Seo | H04W 72/1273 370/252 |
| 2016/0050054 A1* | 2/2016 | Wager | H04W 76/15 455/450 |
| 2016/0088622 A1* | 3/2016 | Dinan | H04W 72/0446 370/336 |
| 2016/0105882 A1* | 4/2016 | Park | H04B 7/024 370/329 |
| 2016/0165631 A1* | 6/2016 | Gao | H04W 72/21 370/336 |
| 2016/0285652 A1* | 9/2016 | Seo | H04L 5/0057 |
| 2017/0070914 A1* | 3/2017 | Chun | H04L 1/0075 |
| 2017/0079027 A1* | 3/2017 | Chun | H04W 72/51 |
| 2017/0317853 A1* | 11/2017 | Seo | H04W 72/1273 |
| 2019/0140866 A1* | 5/2019 | Seo | H04L 5/0094 |
| 2019/0342885 A1* | 11/2019 | Chun | H04W 4/70 |
| 2019/0364560 A1* | 11/2019 | Chun | H04W 72/21 |
| 2020/0195344 A1* | 6/2020 | Jungnickel | H04L 5/0091 |
| 2021/0014811 A1* | 1/2021 | Seok | H04W 76/15 |
| 2021/0037583 A1* | 2/2021 | Seok | H04W 76/15 |
| 2021/0076413 A1* | 3/2021 | Lu | H04W 74/002 |
| 2021/0127420 A1* | 4/2021 | Lu | H04W 74/0808 |
| 2021/0212118 A1* | 7/2021 | Lu | H04W 74/0816 |
| 2021/0337537 A1* | 10/2021 | Chun | H04W 4/70 |
| 2022/0070954 A1* | 3/2022 | Omer | H04L 5/0053 |
| 2022/0312506 A1* | 9/2022 | Xia | H04W 74/0891 |
| 2023/0018719 A1* | 1/2023 | Seok | H04W 76/30 |
| 2023/0043239 A1* | 2/2023 | Lu | H04W 74/08 |
| 2023/0309151 A1* | 9/2023 | Kim | H04W 74/0866 |
| 2023/0361926 A1* | 11/2023 | Babaei | H04L 5/0048 |
| 2023/0379999 A1* | 11/2023 | Kim | H04L 1/00 |

* cited by examiner

METHOD FOR CHANNEL STATE FEEDBACK IN A NON-SIMULTANEOUS TRANSMIT AND RECEIVE (NSTR) OPERATION MODE

CROSS REFERENCE TO RELATED APPLICATIONS

This application is a continuation of U.S. Non-Provisional patent application Ser. No. 18/491,772, filed on Oct. 22, 2023 and titled "METHOD FOR CHANNEL STATE FEEDBACK IN A NON-SIMULTANEOUS TRANSMIT AND RECEIVE (NSTR) OPERATION MODE". The entire disclosure of the aforementioned application is incorporated by reference as part of the disclosure of this application.

TECHNICAL FIELD

The present disclosure relates to wireless communication, in particular to a method for channel state feedback in the NSTR operation mode and the communication device thereof.

BACKGROUND

In the standardization of next generation wireless local area network (WLAN), a multi-link device (MLD) architecture is introduced, which allows a plurality of links to be established between an access point (AP) multi-link device (AP MLD) and a non-AP MLD (e.g., a STA). Data can be transmitted or received on the plurality of links simultaneously. Further, the non-simultaneous transmit and receive (NSTR) operation mode is proposed to reduce transmission radio frequency interferences between links, considering that the operation frequency interval of some MLD links is insufficient. In this mode, the APs (or STAs) affiliated with MLD are not allowed to receive data on the one link and transmit data on the other links simultaneously. That is, all links are only receiving data or transmitting data at a time.

In the current protocol related to the NSTR operation mode, each link under the NSTR operation mode independently contends a channel by enhanced distributed channel access (EDCA) and distributed coordination function (DCF) mechanisms. Only when backoff counters of all links under the NSTR operation mode reach zero, the links are allowed to transmit data. For the NSTR operation mode, in order to transmit or receive data on multiple links simultaneously, it is necessary to keep the links that reached 0 from sending the data until all NSTR links reach 0.

SUMMARY

Based on the above, the present disclosure provides a method for channel state feedback in a NSTR operation mode, a communication device for channel state feedback in the NSTR operation mode and a related computer-readable storage medium.

In an aspect of the present disclosure, the present disclosure provides a method for channel state feedback implemented in a first communication device, the first communication device being configured with a plurality of links for communicating with a second communication device, the method comprising: receiving first data over a channel of a first link of the plurality of links; determining whether a channel of a second link of the plurality of links is idle in a case that no data is received over the channel of the second link and the first link and the second link belong to a non-simultaneous transmit and receive (NSTR) link pair; and transmitting a feedback frame over the channel of the first link, wherein the feedback frame comprises a first field indicating whether the channel of the second link is idle.

In another aspect of the present disclosure, the present disclosure provides a method for channel state feedback implemented in a second communication device, the second communication device being configured with a plurality of links for communicating with a first communication device, the method comprising: transmitting first data over a channel of a first link of the plurality of links; and receiving a feedback frame is received successfully over the channel of the first link, wherein the feedback frame comprises a first field indicating whether a channel of a second link of the plurality of links is idle.

In yet another aspect of the present disclosure, the present disclosure provides a first communication device for channel state feedback, the first communication device being configured with a plurality of links for communicating with a second communication device, the first communication device comprising: a receiver, configured to receive first data over a channel of a first link of the plurality of links; a circuit, configured to determine whether a channel of a second link of the plurality of links is idle in a case that no data is received over the channel of the second link and the first link and the second link belong to a non-simultaneous transmit and receive (NSTR) link pair; and a transmitter, configured to transmit a feedback frame over the channel of the first link, wherein the feedback frame comprises a first field indicating whether the channel of the second link is idle.

In yet another aspect of the present disclosure, the present disclosure provides a second communication device for channel state feedback, the second communication device being configured with a plurality of links for communicating with a first communication device, the second communication device comprising: a transmitter, configured to transmit first data over a channel of a first link of the plurality of links; and a receiver, configured to receive a feedback frame over the channel of the first link, wherein the feedback frame comprises a first field indicating whether a channel of a second link of the plurality of links is idle.

In yet another aspect of the present disclosure, the present disclosure provides a first communication apparatus for channel state feedback, the first communication apparatus being configured with a plurality of links for communicating with a second communication apparatus, the first communication apparatus comprising: a mean for receiving first data over a channel of a first link of the plurality of links; a means for determining whether a channel of a second link of the plurality of links is idle in a case that no data is received over the channel of the second link and the first link and the second link belong to a non-simultaneous transmit and receive (NSTR) link pair; and a means for transmitting a feedback frame over the channel of the first link, wherein the feedback frame comprises a first field indicating whether the channel of the second link is idle.

In yet another aspect of the present disclosure, the present disclosure provides a second communication apparatus for channel state feedback, the second communication apparatus being configured with a plurality of links for communicating with a first communication apparatus, the second communication apparatus comprising: a means for transmitting first data over a channel of a first link of the plurality of links; and a means for receiving a feedback frame over the channel of the first link, wherein the feedback frame comprises a first field indicating whether a channel of a second link of the plurality of links is idle.

In yet another aspect of the present disclosure, the present disclosure provides a computer-readable storage medium storing instruction thereon which, when being executed by a processor, implements the method for channel state feedback in the NSTR operation mode according to embodiments of the present disclosure.

The present disclosure further provides a new feedback frame, which can notify whether data is received successfully and indicate channel states of links of the NSTR link pair.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In addition, for the sake of brevity, some commonly known details (e.g., time for signal processing) are omitted in drawings. In the drawings, unless otherwise explicitly indicated, the same reference numerals refer to the same components, steps or elements. In the accompanying drawings.

FIG. 1*l* shows an example configuration of a communication device, for example an AP, according to an embodiment of the present disclosure.

DETAILED DESCRIPTION

Figure 1:
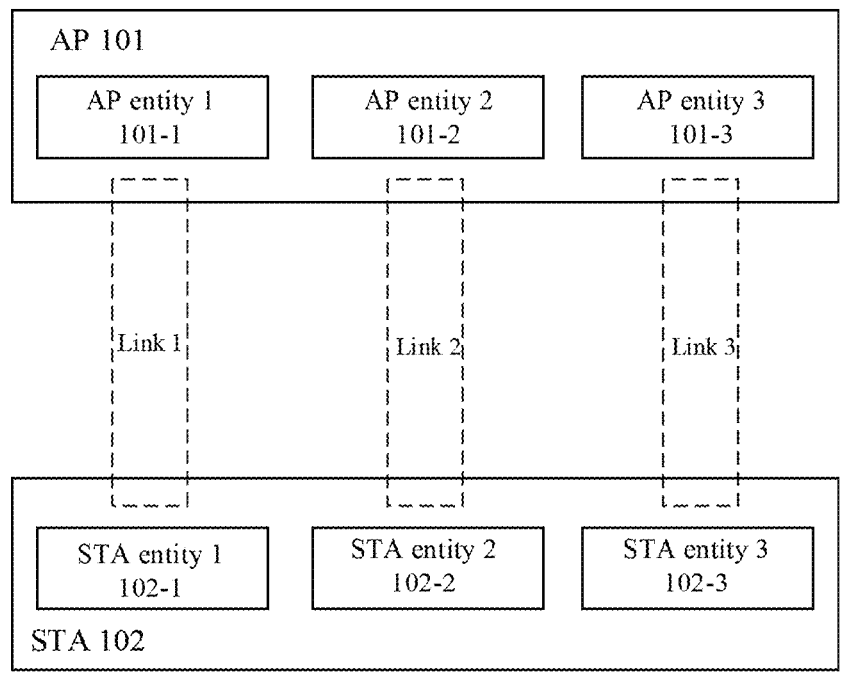
FIG. 1 shows an exemplary MLD architecture according to an embodiment of the present disclosure.

The technical solution of the present disclosure will be clearly and completely described below in conjunction with accompanying drawings. Obviously, the described embodiments are part of embodiments of the present disclosure, but not all of them. Based on the embodiments in the present disclosure, all other embodiments obtained by ordinary skilled in the art without making any creative efforts fall within the scope of protection of the present disclosure.

In the description of the present disclosure, it should be noted that orientations or positional relationships indicated by terms such as "center", "upper", "lower", "left", "right", "vertical", "horizontal", "inside" and "outside" are based on orientations or positional relationships shown in the drawings, only for the convenience of describing the present disclosure and simplifying the description, instead of indicating or implying the indicated device or element must have a particular orientation. In addition, terms such as "first", "second" and "third" are only for descriptive purposes, whereas cannot be understood as indicating or implying relative importance. Likewise, words like "a", "an" or "the" do not represent a quantity limit, but represent an existence of at least one. Words like "include" or "comprise" mean that an element or an object in front of the said word encompasses those ones listed following the said word and their equivalents, without excluding other elements or objects. Words like "connect" or "link" are not limited to physical or mechanical connections, but may include electrical connections, whether direct or indirect.

In the description of the present disclosure, it should be noted that, unless otherwise explicitly specified and limited, terms such as "mount", "link" and "connect" should be understood in a broad sense. For example, such terms may refer to being fixedly connected, or detachably connected, or integrally connected; may refer to being mechanically connected, or electrically connected; may refer to being directly connected, or indirectly connected via an intermediate medium, or internally connected inside two elements. For ordinary skilled in the art, the specific meanings of the above terms in the present disclosure may be understood on a case-by-case basis.

In addition, technical features involved in different embodiments of the present disclosure described below may be combined with each other as long as no conflicts occurs therebetween. Further, figures are merely for illustration and are simplified for brevity and thus may be not exactly the same as practical implementations. For example, in figures, the processing delay of devices may be omitted.

In the following paragraphs, certain exemplifying embodiments are explained with reference to the AP MLD and the non AP MLD (e.g., STA MLD) in WLAN.

In the present disclosure, an AP, which may be interchangeably referred to as a wireless access point (WAP), is a communication device that can communicate with a non AP (e.g., STA) in a WLAN via a plurality of links and that allows the non AP to connect to a wired network. The AP usually connects to a router (via a wired network) as a standalone device, but it can also be integrated with or employed in the router.

Likewise, in the present disclosure, a non AP (e.g., a station, which is interchangeably referred to as a STA) is a communication device that can communicate with an AP via a plurality of links. The STA can be any device that contains an IEEE 802.11-conformant media access control (MAC) and physical layer (PHY) interface to the wireless medium (WM). For example, a STA may be a laptop, a desktop personal computer (PC), a personal digital assistant (PDA), an access point or a Wi-Fi phone in a WLAN environment. The STA may be fixed or mobile. In the WLAN environment, the terms "STA", "wireless client", "user", "user device", and "node" are often used interchangeably.

In the present disclosure, a STA in a WLAN may work as an AP at a different occasion, and vice versa. This is because communication devices in the context of IEEE 802.11 (Wi-Fi) technologies may include both STA hardware components and AP hardware components. In this manner, the communication devices may switch between a STA mode and an AP mode, based on actual WLAN conditions and/or requirements. In various embodiments below, a non-AP STA may refer to a STA in a WLAN that is not implemented as an AP.

FIG. 1 shows the exemplary MLD architecture according to an embodiment of the present disclosure. In the present disclosure, as shown in FIG. 1, the MLD architecture can allow three links (i.e., link 1 between AP entity 1 101-1 and STA entity 1 102-1, link 2 between AP entity 2 101-2 and STA entity 2 102-2 and link 3 between AP entity 3 101-3 and STA entity 3 102-3) of different frequency bands to be established between an AP 101 and a STA 102. Data can be transmitted or received on the three links simultaneously. In an embodiment, the three links can be established in different frequency bands by different chips, for example 2.4 Ghz, 5 Ghz and 6 Ghz frequency bands. In another embodiment, the three links can be established in the same frequency band by one chip. For example, links 1-3 in FIG. 1 can be operated in any one of 2.4 Ghz, 5 Ghz and 6 Ghz frequency bands. In the disclosure, the AP entity and the STA entity refer to logic means (e.g., a circuit and/or software) in the AP and STA that is used to establish the link and operates on this link. Note, it should be understood that 2.4 Ghz, 5 Ghz and 6 Ghz frequency bands listed above are merely examples of the frequency bands in which the links can be established and operated, but not a limitation. That is, links can be established and operated, by AP or STA in other frequency bands in addition to 2.4 Ghz, 5 Ghz and 6 Ghz frequency bands.

As stated above, the NSTR operation mode is proposed to reduce the transmission radio frequency interference between links under the MLD architecture, considering that the operation frequency interval of some of the links is insufficient. In this mode, the AP entities (or STA entities) under MLD are not allowed to receive data and transmit data simultaneously. That is, all links (i.e., NSTR links) are only receiving data or transmitting data at a time. Note, it should be understood that it is not necessary that all links under the MLD architecture are operated in NSTR operation mode. For example, in an embodiment, all three links in FIG. 1 can be operated in the NSTR operation mode, since the operation frequency interval among the three links is not insufficient. In another embodiment, link 1 and link 2 can be operated in the NSTR operation mode, but link 3 is not operated in NSTR operation mode, since the operation frequency internal between link 1 and link 2 is insufficient but the operation frequency internal between (link 1, link 2) and link 3 is large enough to avoid transmission radio frequency interference. In addition, it also should be understood that more or less than three links can be established between an AP and a STA, although three links are shown in FIG. 1.

In the NSTR operation mode, the MLD (e.g., the AP entities and the STA entities under the MLD) must align the start timing of the transmission or reception of data on the plurality of links, since it is necessary to transmit the data or receive the data simultaneously. In this case, the current protocol provides the following relevant provisions on the channel contention mechanism.

A STA affiliated with an MLD operating on a link that is part of an NSTR link pair for that MLD shall follow the channel access procedure described below:

1) The STA may initiate transmission on a link when the medium is idle as indicated by the physical and virtual CS mechanism and one of the following conditions is met:
   a) The STA obtained an EDCA TXOP following the procedure in 10. 23. 2.4 (Obtaining an EDCA TXOP).
   b) The backoff counter of the STA is already zero, and the STA operating on the other link of NSTR link pair of the affiliated MLD obtains an EDCA TXOP following the procedure in 10. 23. 2.4 (Obtaining an EDCA TXOP).

2) When the backoff counter of the STA reaches zero, it may choose to not transmit and keep its backoff counter at zero. A STA with backoff counter that has already reached zero may initiate transmission only following condition 1b).

3) A STA with backoff counter that has already reached zero and that chose not to transmit following condition 1b) may perform a new backoff procedure following deferral as described in 10. 23. 2.4 (Obtaining an EDCA TXOP) and 10.3.4.3 (Backoff procedure for DCF) before being allowed to initiate transmission on a link following condition 1a). In such a case, CW[AC] (Access Category) and QSRC [AC] are left unchanged.

In the current EDCA mechanism, the waiting time (e.g., arbitration interframe space (AIFS)) before contention for a certain AC packet is:

$$AIFS[AC]=AIFSN[AC] \times aSlot\ Time+aSIFSTime$$

If the channel remains clear during the AIFS, the data corresponding to the AC initiates a contention on the link.

When the contention is initiated, a number is randomly selected from [CWmin, CWmax] as the initial counter value of the backoff counter configured for the data corresponding to the AC, and then the channel state feedback is started. When the backoff counter reaches 0, the data corresponding to the AC can obtain this transmission opportunity (TXOP) through the contention and can start data transmission. If the channel is detected to be busy (e.g., by clear channel assessment (CCA)) during the counting, the counting will be paused until the channel is clear again.

According to the above, it is understood that each link of NSTR links follows the channel access mechanism of independent distributed coordination function (DCF) or EDCA contention. Specifically, under the NSTR operation mode, all links are allowed to transmit or receive a signal (e.g., data) only when backoff counters of all the links reach zero. In practices, there are two methods for a data transmission in the NSTR operation mode, as described with referenced to FIGS. 2 and 3 below.

Figure 2:
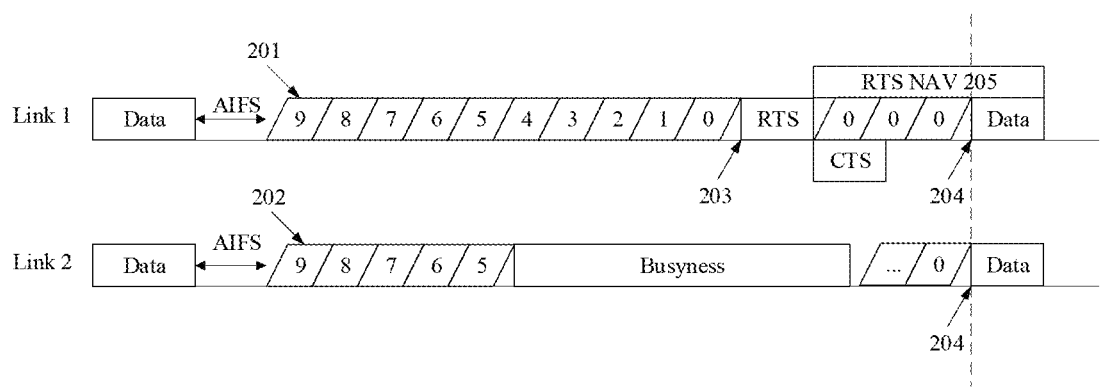
FIG. 2 is a schematic diagram for illustrating a data transmission method in the NSTR operation mode in the prior art.

FIG. 2 is a schematic diagram for illustrating a data transmission method in the NSTR operation mode in the prior art. As shown in FIG. 2, when a backoff counter 201 of link 1 reached 0 at timing 203 but backoff counter 202 of link 2 does not reach 0, the link 1 can announce to occupy a transmission opportunity (TXOP) for a time period, i.e., RTS NAV (Network Allocation Vector) 205, by a request to send/clear to send (RTS/CTS) mechanism. When the backoff counter 202 of the link 2 reaches 0 at timing 204, data can be transmitted over channels of the link 1 and link 2 synchronously.

Figure 3A:
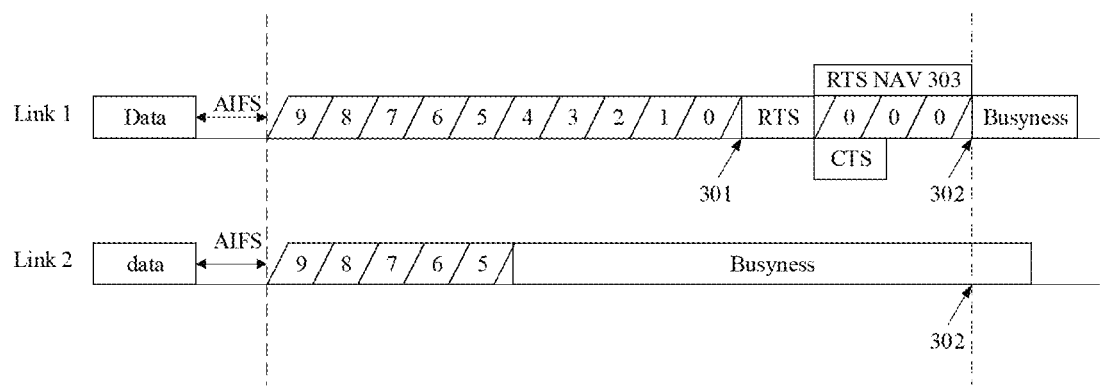
FIGS. 3A and 3B is a schematic diagram for illustrating a possible drawback in the data transmission method in the NSTR operation mode shown in FIG. 2.
Figure 3B:
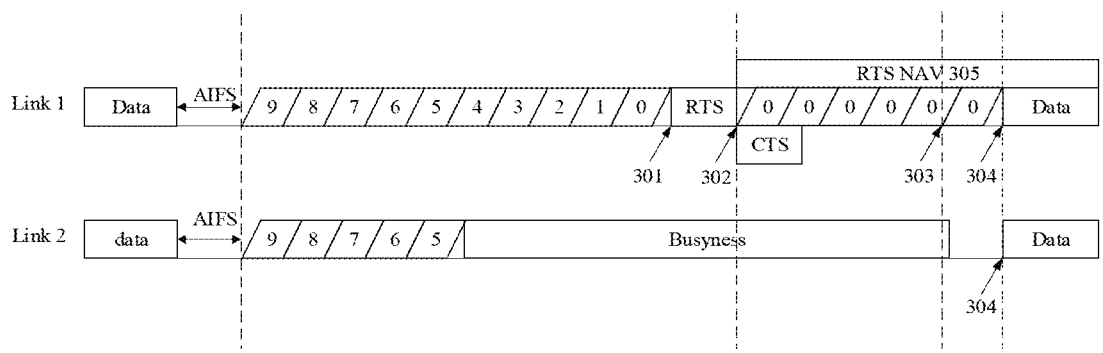

However, there is an issue in the data transmission method shown in FIG. 2. That is, how long the RTS NAV should be. If the RTS NAV is set too short, the TXOP occupied by the link 1 (i.e., RTS NAV 303) is end before the busyness of the channel of the link 2 is end, resulting in a waste of this TXOP time occupied by the link 1, as shown in FIG. 3A. If the RTS NAV is set too long, the link occupying the TXOP may wait long time before a data transmission, resulting in a waste of channel resources, e.g., there is a waste of the channel resources during timing 302 and 303 shown in FIG. 3B.

Figure 4:
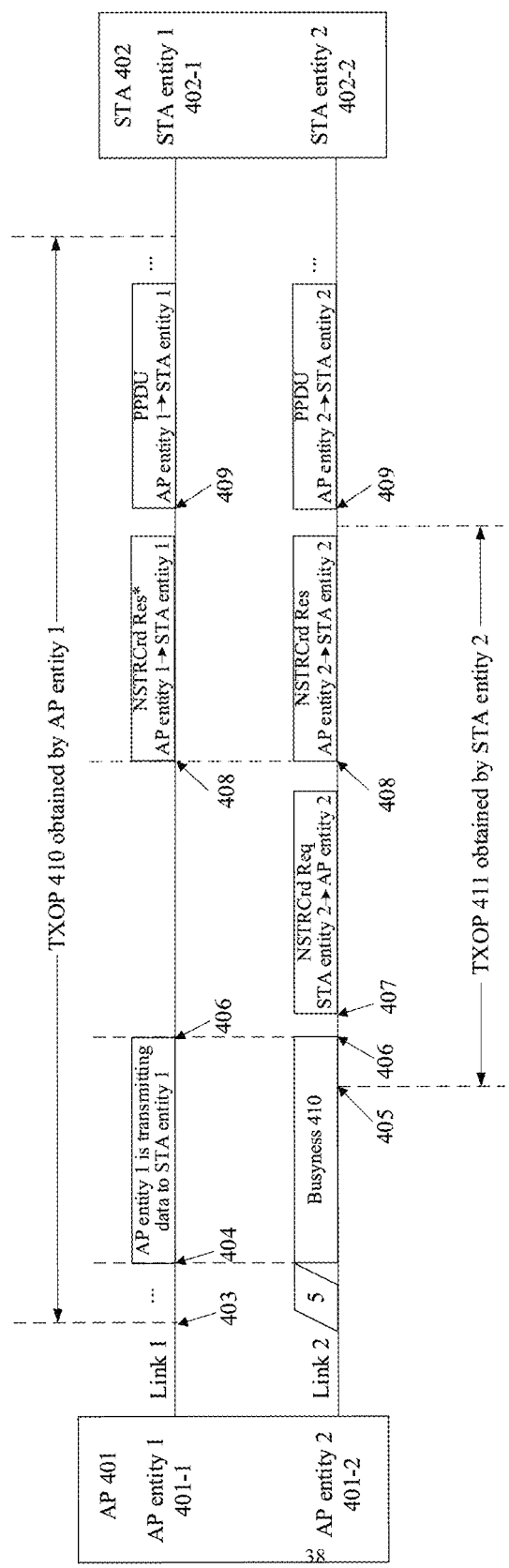
FIG. 4 is a schematic diagram for illustrating another data transmission method in the NSTR operation mode in the prior art.

FIG. 4 is a schematic diagram for illustrating another data transmission method in the NSTR operation mode in the prior art. As shown in FIG. 4, when a backoff counter of link 1 reaches 0 and the link 1 obtains the TXOP 410 at timing 403, AP entity 1 401-1 directly transmits data over a channel of the link 1 at timing 404 after a preparation for the data transmission, without waiting for a backoff counter of the link 2 to reach 0. In this case, a channel of the link 2 is detected to be busy by the AP entity 2 401-2 (i.e., the busyness 410 shown in FIG. 4) due to the data transmission over the channel of the link 1 (i.e., in-device coexistence (IDC) interference), if the link 1 and the link 2 belong to a NSTR link pair. However, in fact, if there is no other interferences on the channel of the link 2 other than the IDC interference as described above, for example there is no interference on the channel of the link 2 caused by a data transmission of another communication device over a channel which is operated in the same frequency as the channel of the link 2, the channel of the link 2 should be deemed as idle and data can be transmitted over the channel of the link 2. In order to determine whether there is no other interferences on the channel of the link 2 other than the IDC interference, a mechanism of the associated opposite communication device determining the idle state of the channel is proposed. Specifically, in a case of FIG. 4, the associated opposite communication device, i.e., STA entity 2 402-2 can determine whether the channel of the link 2 is idle. The STA entity 2 402-2 obtains the TXOP 411 at timing 405 and can transmit a NSTR coordination request, NSTRCrd Req, to the AP entity 1 401-2 over the channel of the link 2 at timing 407 to request the AP 401 coordinates data transmissions over the channels of the link 1 and link 2. The AP 410 (i.e., the AP entity 1 401-1 and the AP entity 2 401-2) can respond to the NSTRCrd Req by transmitting NSTRCrd Res and NSTRCrd Res* over the channel of the link 1 and the channel of the link 2 respectively. Then, the AP entity 1 401-1 and the AP entity 2 401-2 can transmit data over the channels of the link 1 and the link 2 synchronously at timing 409.

Figure 5:
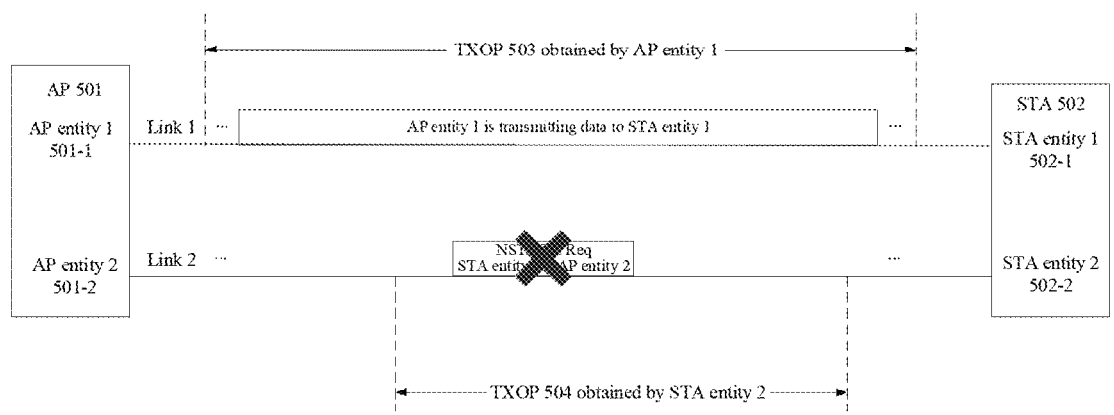
FIG. 5 is a schematic diagram for illustrating a possible drawback in the data transmission method in the NSTR operation mode shown in FIG. 4.

However, due to the constraint of the NSTR operation mode itself, i.e., all links in the NSTR operation mode can only receive data or transmit data at a time, when AP entity obtaining the TXOP continuously transmits data over the channel of the link during the TXOP obtained by an associated opposite communication device (e.g., a STA entity), the associated opposite communication device cannot transmit the NSTR coordination request, NSTRCrd Req, causing the NSTR coordination to be not initiated. FIG. 5 illustrates this possible issue. As shown in FIG. 5, the associated opposite STA entity 2 502-2 can't transmit the NSTR coordination request, NSTRCrd Req, to the AP entity 2 501-2 during the TXOP 504 obtained by the STA entity 2 502-2, since the AP entity 1 501-1 continuously transmits data over the channel of the link 1 during the TXOP 504.

Based on the above, the present disclosure provides a method for channel state feedback in the NSTR operation mode and the communication device thereof. This provided method for channel state feedback can feed back a state of a channel of a link over which a transmitting device does not transmit data, even when the transmitting device continuously transmits the data over a channel of another link which belong to the same NSTR link pair as the link, thereby addressing the issue in the data transmission method in the NSTR operation mode in the prior art shown in FIG. 4. As a result, the data can be transmitted or received over channels of all links in the NSTR link pair timely, thereby causing the channel resources to be used more sufficiently, and facilitating an improvement of data throughput in the communication system and a reduction of data transmission latency.

Figure 6:
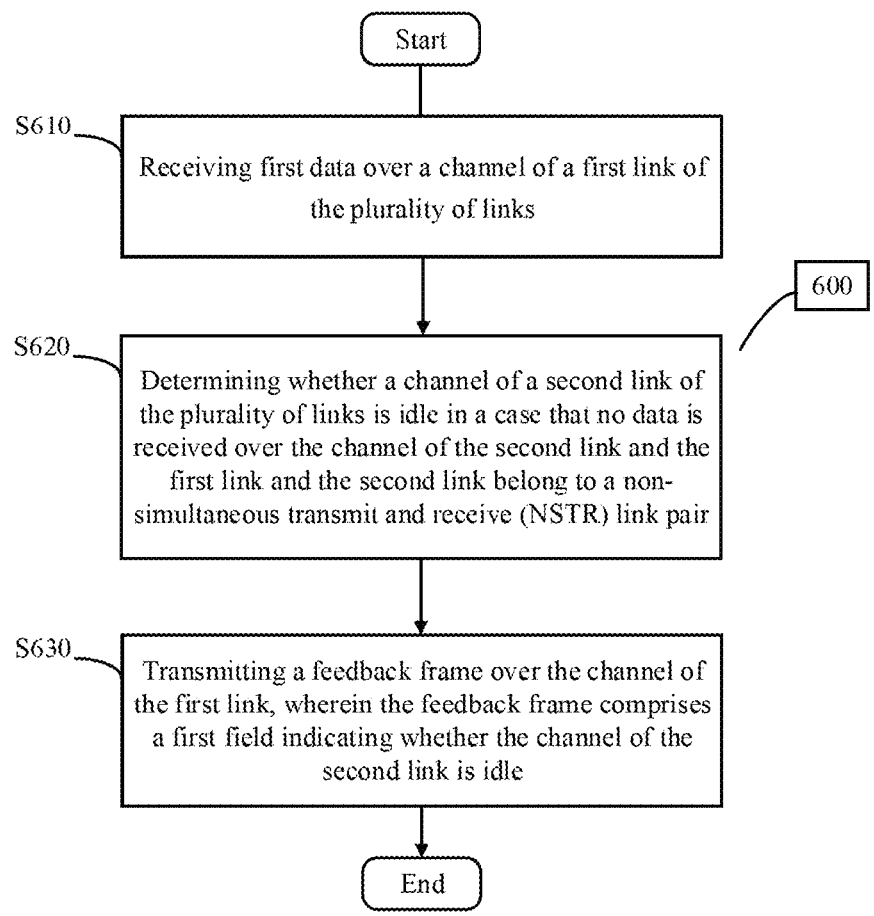
FIG. 6 shows a method for channel state feedback in the NSTR operation mode implemented in a first communication device according to an embodiment of the present disclosure.

FIG. 6 shows a method for channel state feedback 600 in the NSTR operation mode implemented in a first communication device according to an embodiment of the present disclosure. The first communication device can be configured with a plurality of links for communicating with a second communication device. In an embodiment, the first communication device can be an AP and the second communication device can be a STA. Alternatively, the first communication device can be the STA and the second communication device can be the AP. Yet alternatively, both the first communication device and the second communication device are the APs. Yet alternatively, both the first communication device and the second communication device are the STAs. As an example, the plurality of links can be three links as shown in FIG. 1, e.g., operated in any one of 2.4 Ghz, 5 Ghz and 6 Ghz frequency bands.

Figure 8:
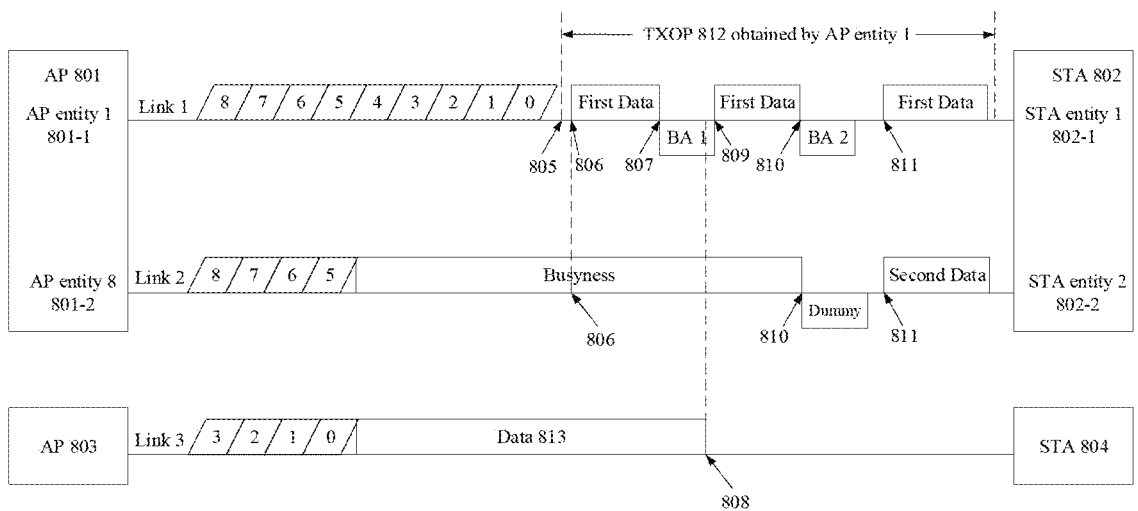
FIG. 8 is a schematic diagram for illustrating an exemplary scenario in which the method for channel state feedback in the NSTR operation mode according to the embodiment of the present disclosure is applied.

As shown in FIG. 6, the method for channel state feedback 600 starts at block S610. At block S610, first data is received over a channel of a first link of the plurality of links. The first data can be transmitted by the second communication device in a TXOP in response to its first link obtaining the TXOP without waiting idleness of channels of other links operated in the NSTR operation mode together with the first link, e.g., other links belonging to the same NSTR link pair as the first link. For example, as shown in FIG. 8, AP 801, more specifically, AP entity 1 801-1 can transmit data (i.e., first data) over the channel of the link 1 in the TXOP 812 obtained by the AP entity 1 (e.g., at timing 806 and 809) in response to obtaining the TXOP 812, without waiting the idleness of the channel of the link 2. Accordingly, the STA 802, more specifically, STA entity 1 801-1 can receive the data over the channel of the link 1 from the AP 801. In this way, under the NSTR operation mode, the link (e.g., the link 1 in FIG. 8) obtaining the TXOP can transmit or receive data in the obtained TXOP (e.g., TXOP 812 obtained by AP entity 1 shown in FIG. 8) without waiting idleness of channels of other links (e.g., link 2 in FIG. 8) operated in the NSTR operation mode together with the first link, so that the channel resource of the link obtaining the TXOP can be used during busyness of the channels of the other links (e.g., during timing 806 to 811), thereby facilitate with improving data throughput in the communication system and reducing latency of data transmission or reception.

Then, at block S620, whether a channel of a second link of the plurality of links is idle is determined in a case that the second communication device does not transmit data (i.e., second data) over the channel of the second link and the first link and the second link belong to a non-simultaneous transmit and receive (NSTR) link pair. That is, in this disclosure, the first communication device performs the determination of whether the channel of the second link of the plurality of links is idle, if (1) the second communication device transmits data over the channel of the first link but does not transmit data over the channel of the second link, which may occur when the first link of the second communication device obtains the TXOP but the backoff counter of the second link of the second communication device does not reach 0; and (2) the first link and the second link belong to the same NSTR link pair. In an embodiment, the first communication device can determine that the second communication device transmits the data over the channel of the first link but does not transmit the data over the channel of the second link (i.e., the first link of the second communication device obtains the TXOP but the backoff counter of the second link of the second communication device does not reach 0), if the first communication device receives the data (i.e., the first data) over the channel of the first link but does not receive the data (i.e., the second data) over the channel of the second link. In another embodiment, when the first link of the second communication device obtains the TXOP but the backoff counter of the second link of the second communication device does not reach 0, the second communication device can transmit a signal to request the first communication device to determine whether the channel of the second link is idle before transmitting the first data over the channel of the first link. In this case, the first communication device can determine that the second communication device transmits the data over the channel of the first link but does not transmit the data over the channel of the second link, if the first communication device receives the signal to request the first communication device to determine whether the channel of the second link is idle.

For example, also as shown in FIG. 8, the first communication (more specifically, the STA entity 2 802-2) can start determining whether the channel of link 2 is idle at timing 806, since the AP entity 2 801-2 does not transmit data (i.e., the second data) over the channel of the link 2 which may be determined as above and the link 1 and the link 2 belong to a NSTR link pair. Note, in this disclosure, the description of the first data and the second data and the like is intended to differentiate among data transmitted over channels of different links (for example, differentiate between data transmitted over the channel of the first link (e.g., link 1 in FIG. 1) and data transmitted over the channel of the second link (link 2 in FIG. 2)), rather than to define different data. Exemplarily, the data transmitted over the channel of the first link can be collectively referenced as the first data, and the data transmitted over the channel of the second link can be collectively referenced as the second data. For example, as shown in FIG. 8, the data transmitted over the channel of link a at timing 806, 809 and 811 can be collectively referenced as the first data, even the data transmitted over the channel of link 1 at timing 806, 809 and 811 may be different from each other. Of course, the data transmitting at timing 806, 809 and 811 in FIG. 8 can be the same data. Also as shown in FIG. 8, the data transmitted over the channel of link 2 can be referenced as the second data. In addition, in this disclosure, the first data and the second data can be the same data or different data. For example, in FIG. 8, the first data transmitted over the channel of link 1 at timing 811 and the second data transmitted over the channel of link 2 at timing 811 can be the same data or different data.

In an embodiment, determining whether the channel of the second link is idle can comprises: detecting a medium activity of the channel of the second link after receiving the first data over the channel of the first link; and determining the channel of the second link to be idle in response to that the medium activity of the channel of the second link is not detected for a duration of a predefined number of backoff slots. Additionally or alternatively, in a case where the first link of the second communication device has obtained the TXOP, but the backoff counter of the second link of the second communication device does not reach 0, before the second communication device transmits the first data, the second communication device can transmit a signal to request the first communication device to determine whether the channel of the second link is idle. Upon the first communication device receiving this signal to request to determine whether the channel of the second link is idle, the first communication device can monitor (i.e., detect) the medium activity of the channel of the second link, till the channel of the second link is to be determined to be idle or the second data is received by the first communication device over the channel of the second link. In this case, determining whether the channel of the second link is idle can comprise: detecting a medium activity of the channel of the second link in response to receiving the signal to request the first communication device to determine whether the channel of the second link is idle; and determining the channel of the second link to be idle in response to that the medium activity of the channel of the second link is not detected for a duration of a predefined number of backoff slots. Exemplarily, the predefined number can be a fixed integer, for example 1, 2, or 3 etc. Yet in another example, the predefined number can be a random number. In this manner (i.e., the determination of whether the channel of the second link is idle is performed after the first communication device receives the data over the channel of the first link or in response to receiving the signal to request the first communication device to determine whether the channel of the second link is idle), determining whether the channel of the second link is idle can be performed when necessary, i.e., a backoff counter of the first link in the NSTR link pair has reached ( ) and a backoff counter of the second link in the same NSTR link pair does not reach 0, which is a power saving way for determining whether the channel of the second link is idle since the detection of the medium activity of the channel of the second link is performed when necessary.

It is apparent that the medium activity of the channel of the second link is determined to be not detected in a case that there is no interference on the channel of the second link. In addition to this case, the medium activity of the channel of the second link is determined to be not detected in a case that there is an in-device coexistence (IDC) interference on the channel of the second link caused by the first data transmission over the channel of the first link, and there is no interference on the channel of the second link caused by a data transmission of another communication device (i.e., a third communication device) on a channel which is operated in the same frequency as the channel of the second link. For example, in the example of FIG. 8, there is IDC interference on the channel of the link 2 caused by the data transmission of the AP 801 during timing 809 to 810 since AP 801 (more specifically, AP entity 801-1) is transmitting data over the channel of link 1 during timing 809 to 810, but there is no interference on the channel of the link 2 caused by a data transmission of a AP 803 over the channel of the link 3 which is operated in the same frequency as the channel of link 2 since the data transmission 813 of the AP 803 over the channel of link 3 is ended at timing 808. In this case, the STA 802 (more specifically, the STA entity 2 802-2) determines the medium activity of the channel of the link 2 to be not detected during the timing 809 to 810, although the AP (more specifically, the AP entity 2 801-2) determines the medium activity of the channel of the link 2 to be detected during the timing 809 to 810.

In another embodiment, determining whether the channel of the second link is idle can comprises: initiating an backoff procedure for the second link (e.g., a EDCA or DCF procedure) for contending a TXOP after receiving the first data over the channel of the first link, or in response to receiving the signal to request the first communication device to determine whether the channel of the second link is idle, as described above; and determining the channel of the second link to be idle in response to the second link obtaining the TXOP. During the backoff procedure, a medium activity of the channel of the second link can be detected. Similarly, the medium activity of the channel of the second link is determined to be not detected in a case that there is no interference on the channel of the link 2, or in a case that there is an in-device coexistence (IDC) interference on the channel of the second link caused by the first data transmission over the channel of the first link and there is no interference on the channel of the second link caused by a data transmission of another communication device (i.e., a third communication device) on a channel which is operated in the same frequency as the channel of the second link, as described above. In this manner, the current backoff procedure can be reused, whereby there is no much change to the current implementation.

Return to FIG. 6, at block S630, a feedback frame is transmitted over the channel of the first link. The feedback frame can comprise a first field indicating whether the channel of the second link is idle. Exemplarily, the feedback frame can be a feedback frame for notifying whether the first data is received successfully, i.e., a feedback frame based on an acknowledge/non-acknowledge (ACK/NACK) feedback frame. Of course, the feedback frame can be a separate feedback frame specifically used for indicating whether the channel of the second link is idle. In one embodiment, the first field can include a bitmap for indicating whether channels of links of the NSTR link pair are idle, and in this case each bit of the bitmap corresponds to one of the links. For example, in the example of FIG. 8, two links (i.e., link 1 and link 2) are established between AP 801 and STA 802 and link 1 and link 2 belong to the same NSTR link pair. In this case, feedback frames BA1 and BA2 can include a bitmap for indicating whether channels of link 1 and link 2 are idle, and accordingly the bitmap can include two bits. One bit can correspond to the link 1 and a predefined value of the bit (e.g., 1) can indicate that the channel of the link 1 is idle. The other bit can correspond to the link 2 and the predefined value of the other bit (e.g., 1) can indicate the channel of the link 2 is idle. And in the example of FIG. 8, the bit corresponding to the link 1 always indicates the channel of link 1 is busy due to the data transmission over the channel of the link 1, e.g., by setting the value of this bit to 1. It should be note that the value 1 of the bit in the bitmap indicating idleness of a channel of a corresponding link is just an example, rather than a limitation.

In another embodiment, the first field can include an index of a link whose channel is idle. Also in the example of FIG. 8, if the index of the link 1 is 1 and the index of the link 2 is 2, the first field can include the index 2 of the link 2 for indicating the channel of the link 2 is idle. It should be noted that the above methods for the first field indicating whether the channel of the second link is idle are just examples, instead of a limitation. Any methods for the first field indicating whether the channel of the second link is idle can be used.

Further, the feedback frame can further comprise a field (i.e., a second field) indicating whether the feedback frame comprises the field (i.e., the first field) indicating the channel of the second link is idle.

Figure 9A:
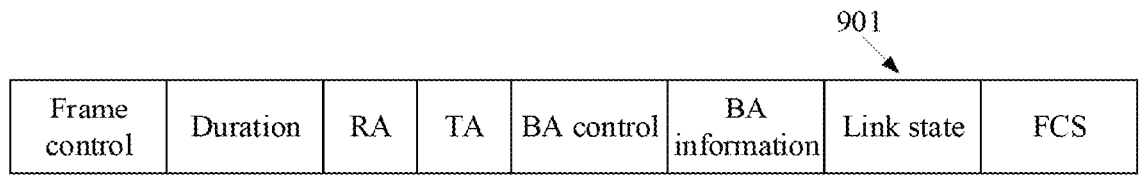
FIG. 9A shows a feedback frame according to an embodiment of the present disclosure.
Figure 9B:
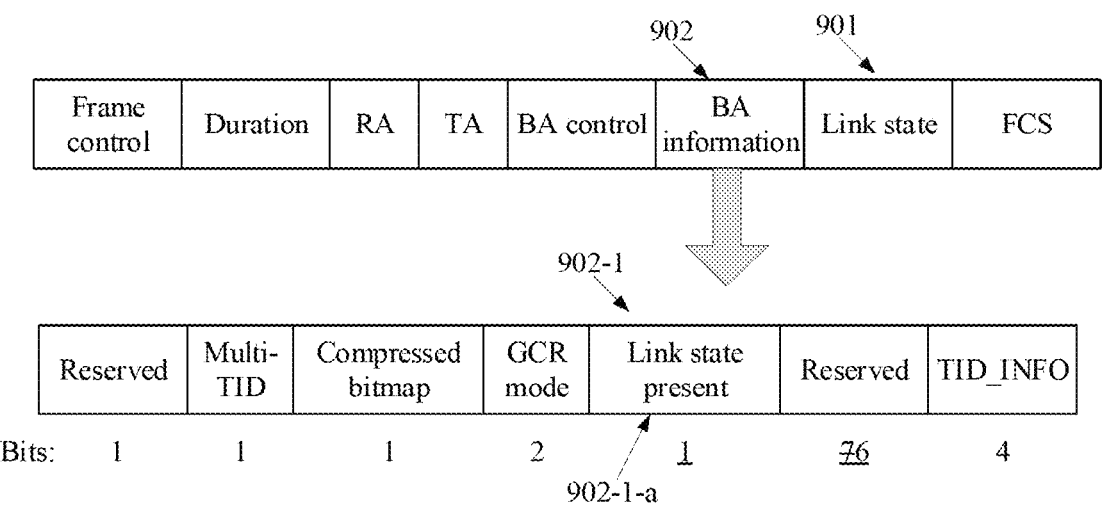
FIG. 9B shows another feedback frame according to another embodiment of the present disclosure.

In practices, the feedback frame can be based on current acknowledge feedback frames. Exemplarily, the feedback frame can be based a current BlockAck frame, and thus this feedback frame may be called Enhanced BlockAck frame herein. In this case, the feedback frame can comprises the first field for indicating whether channels of links in a NSTR link pair are idle, e.g., a link state field 901, between BA information field and FCS field in the BlockAck frame, as shown in FIG. 9A. The feedback frame can further comprise the second field indicating whether the feedback frame comprises the first field, by occupying a bit (e.g., a link state present field 902-1-*a*) of a reserved field of the BA information field in the BlockAck frame, as shown in FIG. 9B.

Regarding when to transmit the feedback frame comprising the first field which indicates whether the channel of the second link is idle. In an embodiment, the feedback frame can be transmitted as long as the device receiving the data (i.e., the first communication device) performs the determination of whether the channel of the second link is idle, regardless whether the channel of the second link is to be determined to be idle (i.e., whether the channel of the second link is actually idle). In this case, the feedback frame can omit the second field indicating whether the feedback frame comprises the first field, since the device transmitting the data (i.e., the second communication device) can expect that the device receiving the data will transmit the feedback frame comprising the first field in a case that it does not transmit the data over the channel of the second link and the first link and the second link belong to a NSTR link pair. Of course, the feedback frame can also comprise the second field indicating whether the first field is included in the feedback frame in this case. For example, taking FIG. 8 as an example for illustration, the STA 802 receiving data in FIG. 8 (more specifically, the STA entity 1 802-1 in FIG. 8) can start transmitting the feedback frame comprising the first field which indicates whether the channel of the link 2 is idle at timing 807, even if the channel of link 2 is busy at that time due to the interference caused by a data transmission (i.e., data 813 in FIG. 8) of the AP 803 on a channel of link 3, wherein the channels of the link 2 and link 3 are operated in the same frequency. In this case, both the feedback frames BA 1 and BA 2 comprise the first field.

In another embodiment, the feedback frame comprising the first field which indicates whether the channel of the second link is idle can be transmitted when the device receiving data (i.e., the first communication device) determines the channel of the second link is idle. That is, the feedback frame comprising the first field is not transmitted until the device receiving data determines the channel of the second link is idle. In this manner, the total signalling load can be reduced since the feedback frame comprising the first field is not transmitted when the channel of the second link is not idle. Also taking FIG. 8 as an example for illustration, since the STA entity 2 802-2 determines the channel of link 2 is idle after the end of the transmission of the data 813, i.e., timing 808, the STA entity 1 802-1 can transmit the feedback frame (i.e., BA 2) comprising the first field indicating the idleness of the channel of the link 2 at timing 809 which is after the timing 808. In this case, BA 1 does not comprise the first field and BA 2 comprises the first field.

After the device transmitting the data (i.e., the second communication device) is notified of the idleness of the channel of the second link by the feedback frame comprising the first field which indicates whether the channel of the second link is idle, the device transmitting the data can transmit first data over the channel of the first link and second data over the channel of the second link synchronously. In an embodiment, in order to make the device transmitting the data transmit the first data over the channel of the first link and the second data over the channel of the second link synchronously, the device receiving the data can transmit a frame (e.g., a dummy frame) over the channel of the second link to announce to occupy a TXOP of the second link for a time period when transmitting the feedback frame comprising the first field indicating the second link is idle over the channel of the first link. In this manner, it is ensured that the first link and the second link of the device transmitting the data can occupy the TXOP, so that the device transmitting the data can transmit the first data over the channel of the first link and the second data over the channel of the second link synchronously. In another embodiment, after receiving the feedback frame comprising the first field indicating the second link is idle, the device transmitting the data can set the backoff counter of the second link to a predetermined number (e.g., 1) and then detect the medium activity of the channels of both the first and the second link for a duration of the predetermined number of backoff slots. Then, the device transmitting the data can transmit the first data over the channel of the first link and the second data over the channel of the second link synchronously as usual, i.e., in response to the first link and the second link obtaining the TXOP after no medium activity is detected for the duration of the predetermined number of backoff slots. Accordingly, the device receiving the data can receive the first data over the channel of the first link and the second data over the channel of the second link synchronously. In an embodiment, the first data can be different from the second data to increase the throughput of the system. In another embodiment, the first data can be the same as the second data to increase a probability of successful data reception. For example, in FIG. 8, the STA 802 (more specifically, STA entity 802-2) can transmit a dummy frame to announce to occupy a TXOP of link 2 for a time period at timing 810 when STA entity 802-1 transmits the BA 2 which comprises the first field indicating that the channel of the link 2 is idle. Then, upon the AP 801 (more specifically, AP entity 1 801-1) receives BA 2 which comprises the first field indicating the channel of the link 2 is idle, the AP 801 can transmit the first data and the second data over the channel of link 1 and the channel of link 2 synchronously at timing 810 by AP entity 1 801-1 and AP entity 2 801-2, respectively. Accordingly, STA 802 can receive the first data over the channel of link 1 and the second data over the channel of link 2 synchronously. Alternatively, when the AP 801 (more specifically, AP entity 1 801-1) receives BA 2 which comprises the first field indicating that the channel of the link 2 is idle, the AP 801 can set the backoff counter of the link 2 to 1 and then detect the medium activity of the channels of both link 1 and link 2 for a duration of one backoff slots (not shown). Then, if no medium activity is detected for the duration of one backoff slots, the AP 801 can transmit the first data over the channel of link 1 and the second data over the channel of link 2 synchronously.

It should be noted that although the method for channel state feedback is described with referenced to two links in the NSTR link pair above, the method for channel state feedback in the disclosure can be applied to a NSTR link pair including more than two links. In this case, the first communication device (i.e., the device receiving the data) can determine whether channels of one or more links in the NSTR link other than the first and second links are idle if the second communication device (i.e., the device transmitting the data) does not transmit data over the channels of the one or more links. Accordingly, the first field further indicates whether the channels of the one or more links are idle.

In the above, the method for channel state feedback implemented in the first communication device (i.e., the device receiving the data) is described with referenced to FIGS. 6 and 8-9B. In the following, the method for channel state feedback implemented in the second communication device (i.e., the device transmitting the data) will be described with referenced to FIGS. 7 and 8-9B.

Figure 7:
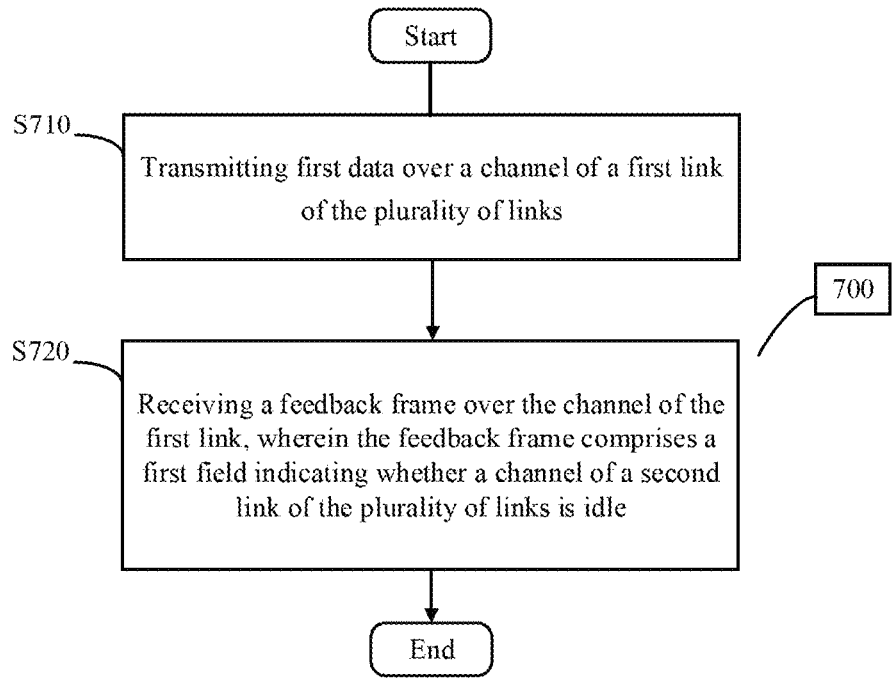
FIG. 7 shows a method for channel state feedback in the NSTR operation mode implemented in a second communication device according to the embodiment of the present disclosure.

FIG. 7 shows a method for channel state feedback 700 in the NSTR operation mode implemented in a second communication device according to the embodiment of the present disclosure. Similarly, the second communication device can be configured with a plurality of links for communicating with a first communication device. In an embodiment, the first communication device can be an AP and the second communication device can be a STA. Alternatively, the first communication device can be the STA and the second communication device can be the AP. Yet alternatively, both the first communication device and the second communication device are the APs. Yet alternatively, both the first communication device and the second communication device are the STAs. As an example, the plurality of links can be three links as shown in FIG. 1, operated in any one of 2.4 Ghz, 5 Ghz and 6 Ghz frequency bands.

As shown in FIG. 7, the method for channel state feedback 700 starts at block 710. At block 710, first data is transmitted over a channel of a first link of the plurality of links. The second communication device can transmit the first data in a TXOP in response to the first link obtaining the TXOP without waiting idleness of the channel of the second link. For example, as shown in FIG. 8, AP 801, more specifically, AP entity 1 801-1 can transmit data (i.e., first data) over the channel of the link 1 in the TXOP 812 obtained by the AP entity 1 without waiting the idleness of the channel of the link 2. Then, at block S720, a feedback frame can be received over the channel of the first link. The feedback frame can comprises a first field indicating whether the channel of the second link of the plurality of links is idle.

As described above, the feedback frame can be transmitted in response to the first communication device determining whether the channel of the second link is idle. The first communication device determines whether the channel of the second link is idle in a case that the second communication device does not transmit data over the channel of the second link and the first link and the second link belong to a non-simultaneous transmit and receive (NSTR) link pair. Exemplarily, the feedback frame can be transmitted as long as the device receiving the data (i.e., the first communication device) performs the determination of whether the second link is idle, regardless whether the channel of the second link is to be determined to be idle (i.e., whether the channel of the second link is actually idle). Alternatively, the feedback frame can be transmitted only when the device receiving the data (i.e., the first communication device) determines that the channel of the second link is idle, as described above. The feedback frame can be the feedback frame shown in FIG. 9A or the feedback frame which comprises a second field indicating whether the feedback frame comprises the first field shown in FIG. 9B. The details for the feedback frame are described above referenced to FIGS. 9A and 8B and thus are omitted here for brevity.

After receiving the feedback frame comprising the first field indicating that the channel of the second link is idle, the second communication (i.e., the device transmitting the data) can transmit a first data over the channel of the first link and a second data over the channel of the second link synchronously. As described above, in order to cause the device transmitting the data to transmit the first data over the channel of the first link and the second data over the channel of the second link synchronously, the device receiving the data can transmit a frame (e.g., a dummy frame) over the channel of the second link to announce to occupy a TXOP of the second link for a time period when transmitting the feedback frame comprising the first field indicating the second link is idle over the channel of the first link. In this manner, it is ensured that the first link and the second link of the device transmitting the data can occupy the TXOP, so that the device transmitting the data can transmit the first data over the channel of the first link and the second data over the channel of the second link synchronously. In another embodiment, after receiving the feedback frame comprising the first field indicating the second link is idle, the device transmitting the data can set the backoff counter of the second link to a predetermined number (e.g., 1) and then detect the medium activity of the channels of both the first and the second link for a duration of the predetermined number of backoff slots. Then, the device transmitting the data can transmit the first data over the channel of the first link and the second data over the channel of the second link synchronously as usual, i.e., in response to the first link and the second link obtaining the TXOP after no medium activity is detected for the duration of the predetermined number of backoff slots. For example, in the example of FIG. 8, the STA 802 (more specifically, STA entity 802-2) can transmit a dummy frame to announce to occupy a TXOP of link 2 for a time period at timing 810 when STA entity 802-1 transmits the BA 2 which comprises the first field indicating that the channel of the link 2 is idle, as described above. Then, when the AP 801 (more specifically, AP entity 1 801-1) receives BA 2 which comprises the first field indicating that the channel of the link 2 is idle, the AP 801 can transmit the first data and the second data over the channel of link 1 and the channel of link 2 synchronously at timing 811 by AP entity 1 801-1 and AP entity 2 801-2, respectively. Alternatively, when the AP 801 (more specifically, AP entity 1 801-1) receives BA 2 which comprises the first field indicating that the channel of the link 2 is idle, the AP 801 can set the backoff counter of the link 2 to 1 and then detect the medium activity of the channels of both link 1 and link 2 for a duration of one backoff slots (not shown). Then, if no medium activity is detected for the duration of one backoff slots, the AP 801 can transmit the first data over the channel of link 1 and the second data over the channel of link 2 synchronously. As can be seen from above, with the method for channel state feedback in the NSTR operation mode described with referenced to the FIGS. 6-9B, for the NSTR operation mode, in a case that a link obtains the TXOP and data is transmitted or received over its channel while channels of other links which belong to the same NSTR link pair as the link obtaining the TXOP are busy, the states (idleness or busyness) of the channels of the other links can be feed backed timely via a feedback frame over the channel of the link obtaining the TXOP, so that the data can be transmitted or received over channels of all links in the NSTR link pair timely based on this channel state feedback, thereby causing the channel resources to be used more sufficiently, and facilitating an improvement of data throughput in the communication system and a reduction of data transmission latency.

In the above disclosures, the method for channel state feedbacks (methods 600 and 700) in the NSTR operation mode are described with referenced to FIGS. 6-9B. In the following paragraphs, a communication device 1000 according to an embodiment of the present disclosure is described with reference to FIGS. 10-12. In the present disclosure, the communication device 1000 (e.g., AP 101 or STA 102 in FIG. 1, or AP 801 or STA 802 in FIG. 8) can be configured with a plurality of links for communicating with another communication device (e.g., AP 101 or STA 102 in FIG. 1, or AP 801 or STA 802 in FIG. 8) and can perform the above methods (e.g., the methods 600 and 700) described with reference to FIGS. 6-9B. For example, the communication device 1000 can be the above first communication device and perform the method 600. Additionally or alternatively, the communication device 1000 can be the above second communication device and perform the method 700.

Figure 10:
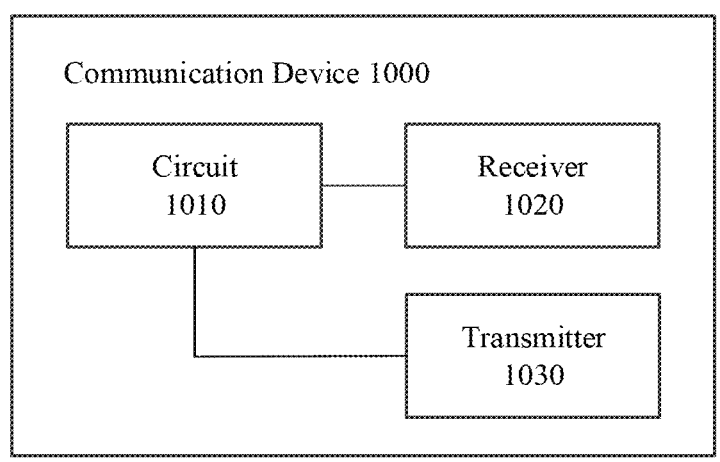
FIG. 10 is a schematic diagram of a communication device according to an embodiment of the present disclosure.

As shown in FIG. 10, the communication device 1000 can comprise a circuit 1010, a receiver 1020 and a transmitter 1030. Exemplarily, the receiver 1020 can be configured to receive first data over a channel of a first link of the plurality of links. The circuit 1010 can be configured to determine whether a channel of a second link of the plurality of links is idle in a case that another communication device transmitting the first data does not transmit data over the channel of the second link and the first link and the second link belong to a non-simultaneous transmit and receive (NSTR) link pair. The transmitter 1030 can be configured to transmit a feedback frame over the channel of the first link, wherein the feedback frame can comprise a first field indicating whether the channel of the second link is idle. Additionally or alternatively, the transmitter can be configured to transmit the first data over the channel of the first link of the plurality of links. The receiver 1020 can be configured to receive the feedback frame over the channel of the first link. The feedback frame can comprise a first field indicating whether the channel of the second link of the plurality of links is idle. In addition, the circuit 1010, the receiver 1020 and the transmitter 1030 can be further configured to perform other operations described above with referenced to FIGS. 6-9B, as long as there is no contradiction among these operations. The receiver 1020 and the transmitter 1030 can be communicatively coupled with the circuit 1010. It should be noted that although the receiver 1020 and the transmitter 1030 are separate components shown in FIG. 10, the receiver 1020 and the transmitter 1030 can be integrated in a transceiver.

Figure 11:
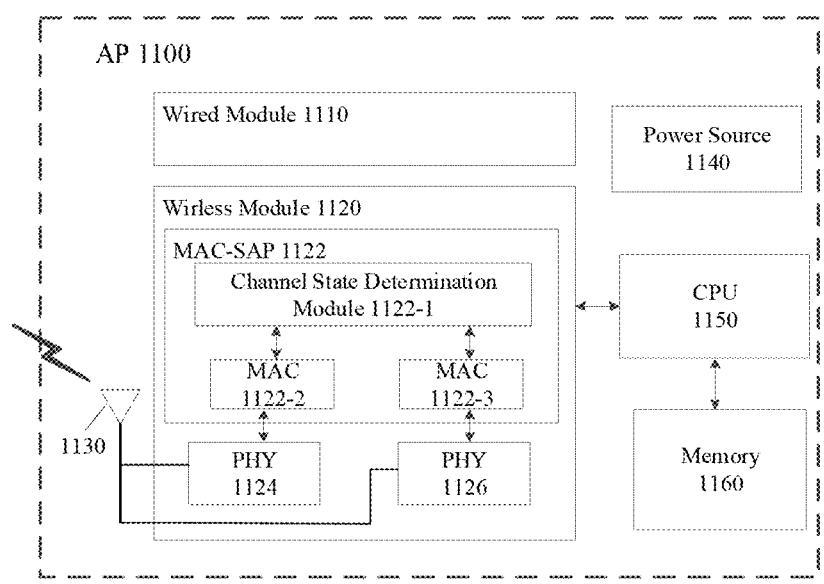

Further, FIG. 1l shows an example configuration of a communication device 1100, for example an AP, according to an embodiment of the present disclosure. The communication device 1100 may include a wired module 1110, a wireless module 1120, at least one antenna 1130 (for the sake of simplicity, only one antenna is shown in FIG. 11), a power source 1140, a central processing unit (CPU) 1150 and at least one memory 1160. The wireless module 1120 may further comprise a MAC-SAP (service access point) 1122 (i.e., the MAC sublayer) and PHY 1124 and PHY 1126 (collectively referred to as the PHY sublayer). The MAC-SAP 1122 can comprise a channel state determination module 1122-1, MAC 1122-2 and MAC 1122-3. The MAC 1122-2 and the PHY 1124 can constitute a AP entity (e.g., AP entity 1 in FIG. 1), which can be used to establish a link (e.g., link 1 in FIG. 1) and transmit/receive signal over a channel of the link via the antenna 1130, and similarly the MAC 1122-3 and the PHY 1126 can constitute another AP entity (e.g., AP entity 2 in FIG. 1), which can be used to establish another link (e.g., link 2 in FIG. 1) and transmit/receive signal over a channel of another link via the antenna 1130. The AP 1100 can be configured with plurality of links (e.g., two links configured by the MAC 1122-2 and the PHY 1124, and the MAC 1122-3 and the PHY 1126, respectively) for communicating with another communication device (e.g., STA 1200 shown in FIG. 12).

In a case that the AP 1100 receives data over a channel of a first link of the plurality of links from the another communication device, the channel state determination module 1122-1 can be configured to determine whether channels of one or more links of the plurality of links are idle in a case that the another communication device does not transmit data over the channels of the one or more links and the first link and the one or more links belong to a non-simultaneous transmit and receive (NSTR) link pair, and perform other related operations as described above. The wireless module 1120 and the CPU 1150 may function together as a circuit (e.g., a circuit 1010 in FIG. 10) of the communication device 1100 configured to perform methods (e.g., methods 600 and 700) as described in the present disclosure. It should be understood that although FIG. 11 shows the MAC-SAP comprises two MACs, more than two MACs can be comprised in the MAC-SAP. The configuration of the communication device (e.g., AP) shown in FIG. 11 is merely as example, but not a limitation. The configuration of the communication device (e.g., AP) in the present disclosure can comprise more or less components than those in FIG. 11.

Figure 12:
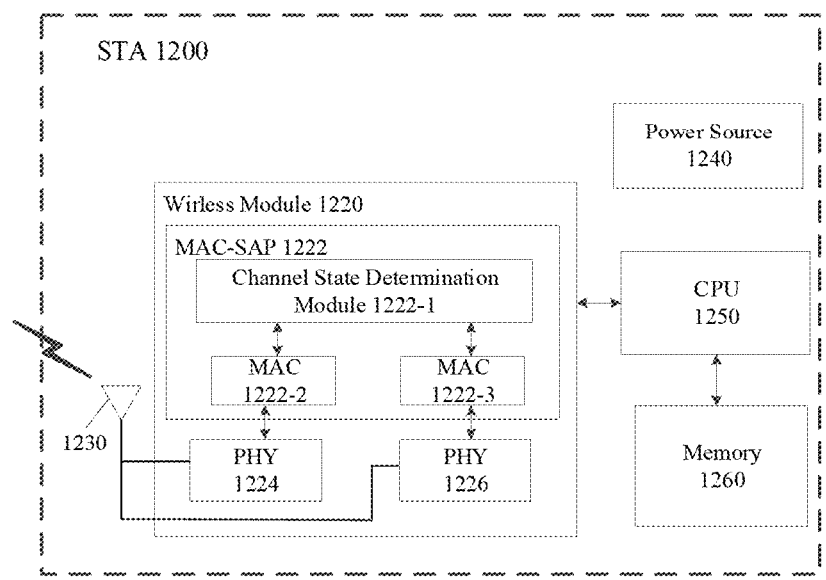
FIG. 12 shows an example configuration of a communication device, for example a non-AP or a STA, according to an embodiment of the present disclosure.

FIG. 12 shows an example configuration of a communication device 1200, for example a STA, according to an embodiment of the present disclosure. The communication device 1200 may include a wireless module 1220, at least one antenna 1230 (for the sake of simplicity, only one antenna is shown in FIG. 12), a power source 1240, a central processing unit (CPU) 1250 and at least one memory 1260. The wireless module 1220 may further comprise a MAC-SAP 1222 (i.e., the MAC sublayer) and PHY 1224 and PHY 1226 (collectively referred to as the PHY sublayer). The MAC-SAP 1222 can comprise a channel state determination module 1222-1, MAC 1222-2 and MAC 1222-3. The MAC 1222-2 and the PHY 1224 can constitute a STA entity (e.g., STA entity 1 in FIG. 1), which can be used to establish a link (e.g., link 1 in FIG. 1) and transmit/receive signal over a channel of the link via the antenna 1230, and similarly the MAC 1222-3 and the PHY 1226 can constitute another STA entity (e.g., STA entity 2 in FIG. 1), which can be used to establish another link (e.g., link 2 in FIG. 1) and transmit/receive signal over a channel of another link via the antenna 1230. The STA 1200 can be configured with plurality of links (e.g., two links configured by the MAC 1222-2 and the PHY 1224, and the MAC 1222-3 and the PHY 1226, respectively) for communicating with another communication device (e.g., AP 1100 shown in FIG. 11).

In a case that the STA 1200 receives data over a channel of a first link of the plurality of links from the another communication device, the channel state determination module 1222-1 can be configured to determine whether channels of one or more links of the plurality of links are idle in a case that the another communication device does not transmit data over the channels of the one or more links and the first link and the one or more links belong to a non-simultaneous transmit and receive (NSTR) link pair, and perform other related operations as described above. The wireless module 1220 and the CPU 1250 may function together as a circuit (e.g., a circuit 1010 in FIG. 10) of the communication device 1200 configured to perform methods (e.g., methods 600 and 700) as described in the present disclosure. Similar to FIG. 11, it should be understood that although FIG. 12 shows the MAC-SAP comprises two MACs, more than two MACs can be comprised in the MAC-SAP. The configuration of the communication device (e.g., STA) shown in FIG. 12 is merely as example, but not a limitation. The configuration of the communication device (e.g., STA) in the present disclosure can comprise more or less components than those in FIG. 12.

In addition, the present disclosure further provides a communication apparatus comprising means for processes of the methods for channel state feedback (e.g., the methods 600 and 700) in the NSTR operation mode according to any embodiments of the present disclosure. Exemplarily, the communication apparatus can be the first communication apparatus for channel state feedback described above. The first communication apparatus can be configured with a plurality of links for communicating with a second communication apparatus and comprise: a mean for receiving first data over a channel of a first link of the plurality of links; a means for determining whether a channel of a second link of the plurality of links is idle in a case that no data is received over the channel of the second link and the first link and the second link belong to a non-simultaneous transmit and receive (NSTR) link pair; and a means for transmitting a feedback frame over the channel of the first link, wherein the feedback frame comprises a first field indicating whether the channel of the second link is idle. Alternatively, the communication apparatus can be the second communication apparatus for channel state feedback as described above. The second communication apparatus can be configured with the plurality of links for communicating with the first communication apparatus and comprise: a means for transmitting first data over a channel of a first link of the plurality of links; and a means for receiving a feedback frame over the channel of the first link, wherein the feedback frame comprises a first field indicating whether a channel of a second link of the plurality of links is idle.

In addition, the present disclosure further provides a computer-readable storage medium storing a computer program thereon which, when being executed by a processor, implements the method for channel state feedbacks (e.g., the methods 600 and 700) in the NSTR operation mode according to any embodiment of the present disclosure.

So far, the present disclosure has disclosed the method for channel state feedback in the NSTR operation mode, the communication device, the communication apparatus and the computer-readable storage medium for the method. In a case that a link obtains the TXOP and data is transmitted or received over its channel while channels of other links which belong to the same NSTR link pair as the link obtaining the TXOP are busy, the provided method, the communication device and the communication apparatus can feed back states (idleness or busyness) of the channels of the other links timely, by the feedback frame over the channel of the link obtaining the TXOP, so that the data can be transmitted or received over channels of all links in the NSTR link pair timely based on this channel state feedback, thereby causing the channel resources to be used more sufficiently, and facilitating an improvement of data throughput and a reduction of data transmission latency.

It should be noted that the above description is only some embodiments of the present disclosure and an illustration of the applied technical principles. It should be understood by those skilled in the art that the present disclosure scope involved in the present disclosure is not limited to the technical solutions resulted from specific combinations of the above technical features, but also encompasses other technical solutions resulted from any combination of the above technical features or their equivalents without departing from the above disclosed concept, for example, the technical solutions formed by replacing between the above features and the technical features with similar functions disclosed in the present disclosure (but not limited thereto).

In addition, although the operations are depicted in a specific order, this should not be understood as requiring these operations to be performed in the specific order shown or in a sequential order. In certain circumstances, multitasking and parallel processing may be beneficial. Likewise, although several specific implementation details are included in the above discussion, these should not be interpreted as limiting the scope of the present disclosure. Some features described in the context of separate embodiments can also be implemented in a single embodiment in combination. On the contrary, various features described in the context of a single embodiment can also be implemented in multiple embodiments alone or in any suitable sub-combination.

Although the subject matter has been described in a language specific to structural features and/or logical acts of methods, it should be understood that the subject matter defined in the appended claims is not necessarily limited to the specific features or acts described above. On the contrary, the specific features and actions described above are merely example forms of implementing the claims.

What is claimed is:

1. A method for channel state feedback implemented in a first communication device, the first communication device being configured with a plurality of links for communicating with a second communication device, the method comprising:
    receiving first data over a channel of a first link of the plurality of links;
    determining whether a channel of a second link of the plurality of links is idle in a case that no data is received over the channel of the second link and the first link and the second link belong to a non-simultaneous transmit and receive (NSTR) link pair, wherein the first link is different from the second link; and
    transmitting a feedback frame over the channel of the first link, wherein the feedback frame comprises a first field indicating whether the channel of the second link is idle, wherein determining whether the channel of the second link is idle comprises:
    detecting a medium activity of the channel of the second link; and
    determining the channel of the second link to be idle in response to that the medium activity of the channel of the second link is not detected for a duration of a predefined number of backoff slots, and
    wherein the medium activity of the channel of the second link is determined to be not detected in a case that there is an in-device coexistence (IDC) interference on the channel of the second link caused by the first data transmission over the channel of the first link, and there is no interference on the channel of the second link caused by a data transmission of a third communication device on a channel which is operated in the same frequency as the channel of the second link.

2. The method of claim 1, wherein the feedback frame is based on a feedback frame for notifying whether the first data is received successfully.

3. The method of claim 1, further comprising: receiving second data over the channel of the second link, wherein the second data is transmitted by the second communication device synchronously with the first data transmission over the channel of the first link in response to the first field indicating the channel of the second link is idle.

4. The method of claim 1, wherein the first data is transmitted by the second communication device in a transmission opportunity (TXOP) in response to the first link obtaining the TXOP without waiting idleness of the channel of the second link.

5. The method of claim 1, wherein the first field includes a bitmap for indicating whether channels of links of the NSTR link pair are idle, and wherein each bit of the bitmap corresponds to one of the links.

6. The method of claim 2, wherein the feedback frame for notifying whether the first data is received successfully is a BlockAck frame, and wherein the feedback frame further comprises a second field indicating whether the feedback frame comprises the first field, the second field occupying a bit of a reserved field in the BlockAck frame.

7. The method of claim 1, wherein
    the medium activity of the channel of the second link is detected after receiving the first data over the channel of the first link.

8. The method of claim 1, wherein the first link and each of NSTR link pair further comprises the plurality of one or more links except the first link form the NSTR link pair in addition to the first link and the second link, the method further comprising:
    determining whether channels of the plurality of one or more links except the first link are idle in a case that no data is received over the channels of the plurality of one or more links except the first link, wherein the first field further indicates whether the channels of the plurality of one or more links except the first link are idle.

9. The method of claim 1, wherein the first communication device is an access point (AP) and the second communication device is a station (STA), or the first communication device is the STA and the second communication device is the AP, or both the first communication device and the second communication device are the APs, or both the first communication device and the second communication device are the STAs.

10. A method for channel state feedback implemented in a second communication device, the second communication device being configured with a plurality of links for communicating with a first communication device, the method comprising:
    transmitting first data over a channel of a first link of the plurality of links; and
    receiving a feedback frame over the channel of the first link, wherein the feedback frame comprises a first field indicating whether a channel of a second link of the plurality of links is idle, wherein the first link is different from the second link,
    wherein whether the channel of the second link is idle is determined by:
    detecting a medium activity of the channel of the second link; and
    determining the channel of the second link to be idle in response to that the medium activity of the channel of the second link is not detected for a duration of a predefined number of backoff slots, and
    wherein the medium activity of the channel of the second link is determined to be not detected in a case that there is an in-device coexistence (IDC) interference on the channel of the second link caused by the first data transmission over the channel of the first link, and there is no interference on the channel of the second link caused by a data transmission of a third communication device on a channel which is operated in the same frequency as the channel of the second link.

11. The method of claim 10, wherein the feedback frame is transmitted in response to the first communication device determining whether the channel of the second link is idle, the first communication device determining whether the channel of the second link is idle in a case that no data is received over the channel of the second link and the first link and the second link belong to a non-simultaneous transmit and receive (NSTR) link pair.

12. The method of claim 10, further comprising:
transmitting the first data over the channel of the first link and second data over the channel of the second link synchronously in response to the first field indicating the channel of the second link is idle.

13. The method of claim 10, wherein transmitting the first data comprises:
transmitting the first data in a transmission opportunity (TXOP) in response to the first link obtaining the TXOP without waiting idleness of the channel of the second link.

14. The method of claim 11, wherein the first field includes a bitmap for indicating whether channels of links of the NSTR link pair are idle, and wherein each bit of the bitmap corresponds to one of the links.

15. The method of claim 10, wherein the feedback frame further comprises a second field indicating whether the feedback frame comprises the first field.

16. The method of claim 15, wherein the feedback frame is based on a BlockAck frame, and wherein the second field occupies a bit of a reserved field in the BlockAck frame.

17. The method of claim 11, wherein the first link and NSTR link pair further comprises each of the plurality of one or more links except the first link form the NSTR link pair in addition to the first link and the second link, and wherein the first field further indicates whether channels of the plurality of one or more links except the first link are idle.

18. The method of claim 10, wherein the first communication device is an access point (AP) and the second communication device is a station (STA), or the first communication device is the STA and the second communication device is the AP, or both the first communication device and the second communication device are the APs, or both the first communication device and the second communication device are the STAs.

19. A first communication device for channel state feedback, the first communication device being configured with a plurality of links for communicating with a second communication device, the first communication device comprising:
a receiver, configured to receive first data over a channel of a first link of the plurality of links;
a circuit, configured to determine whether a channel of a second link of the plurality of links is idle in a case that no data is received over the channel of the second link and the first link and the second link belong to a non-simultaneous transmit and receive (NSTR) link pair, wherein the first link is different from the second link; and
a transmitter, configured to transmit a feedback frame over the channel of the first link, wherein the feedback frame comprises a first field indicating whether the channel of the second link is idle,
wherein to determine whether the channel of the second link is idle, the circuit is further configured to:
detect a medium activity of the channel of the second link; and
determine the channel of the second link to be idle in response to that the medium activity of the channel of the second link is not detected for a duration of a predefined number of backoff slots, and
wherein the medium activity of the channel of the second link is determined to be not detected in a case that there is an in-device coexistence (IDC) interference on the channel of the second link caused by the first data transmission over the channel of the first link, and there is no interference on the channel of the second link caused by a data transmission of a third communication device on a channel which is operated in the same frequency as the channel of the second link.

20. The first communication device of claim 1, wherein the feedback frame is based on a feedback frame for notifying whether the first data is received successfully.

* * * * *